UNITED STATES PATENT OFFICE.

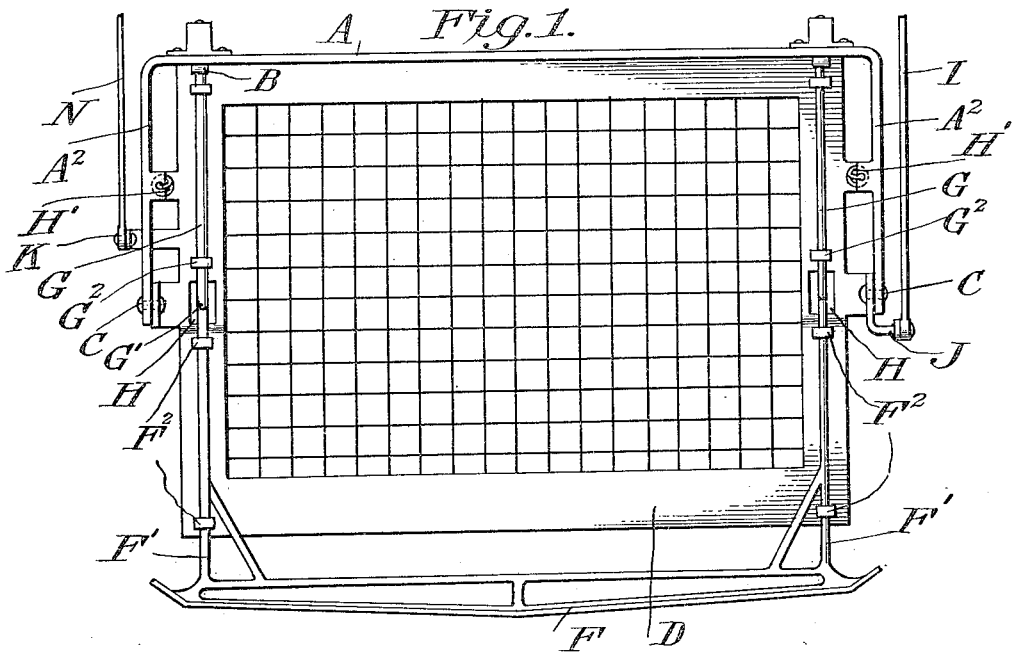
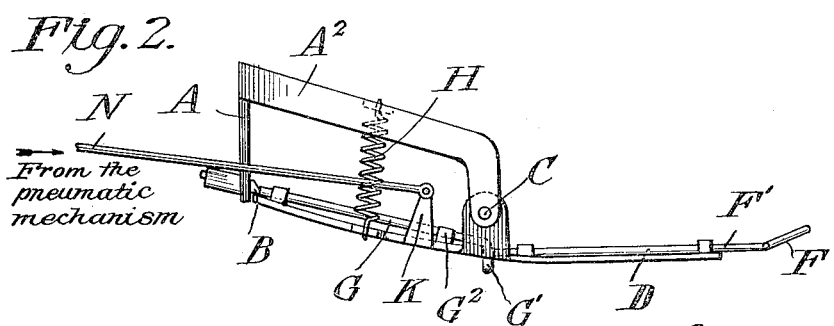
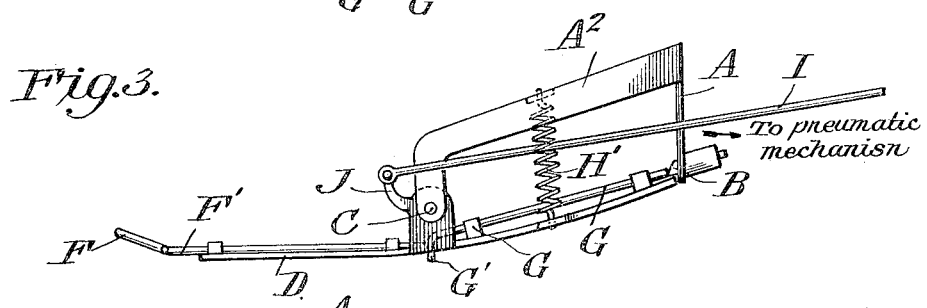

FREDERICK ROBERT WOOLLEY, JR., OF GREAT FALLS, MONTANA.

AUTOMATIC FENDER.

1,137,563.　　　　Specification of Letters Patent.　　Patented Apr. 27, 1915.

Application filed September 12, 1914. Serial No. 861,411.

*To all whom it may concern:*

Be it known that I, FREDERICK R. WOOLLEY, Jr., a citizen of the United States, residing at Great Falls, in the county of Cascade and State of Montana, have invented a certain new and useful Improvement in an Automatic Fender; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic double action fenders for use upon cars, the object in view being to produce a simple and efficient mechanism of this nature so arranged that when the fender comes in contact with an obstruction, mechanism will be released to allow the fender to drop and cause brake actuating means to be operated.

The invention consists further in the provision of means, in connection with the fender releasing device, for applying air brakes simultaneously with pneumatic means for returning the fender to its normal position.

The invention comprises various details of construction and combinations and arrangements of parts which will be hereinafter fully described and then specifically defined in the appended claims.

My invention is illustrated in the accompanying drawings, in which—

Figure 1 is a top plan view of a fender made in accordance with my invention. Fig. 2 is a view in elevation of one side of the fender. Fig. 3 is a view in elevation of the opposite side, and Fig. 4 is a sectional view through the latch throwing mechanism.

Reference now being had to the details of the drawings by letter, A designates one section of the fender which is adapted to be rigidly fastened to a car in any suitable manner and is provided with two spring-actuated latches B, the free ends of which project through apertures A′ formed in the frame of the fender section A. Braces A² forming a part of the frame of the section A project forwardly and downwardly and thence back to the frame proper, and C designate pivotal pins whereby said braces are pivotally connected to the fender section D.

Said fender section D may be of any desired shape, preferably curved slightly upward from its center toward its rear end, while the part intermediate the center and the forward end is normally substantially horizontal.

A truss buffer bar designated by the letter F has rods F′ projecting therefrom, guided by the straps F² on the frame of the fender section D, and G designate rods with their forward ends G′ downwardly curved and extending through the openings H in the frame of the fender section D and against which curved ends, the rear or inner ends of the rods F′ are adapted to contact. Said rods G are guided in the loops or straps G² and their inner ends are adapted to rest against the beveled portions of the latches B. Coiled springs designated by the letter H are fastened at their rear ends to laterally projecting lugs forming a part of the frame of the fender section D, and their other ends are fastened to the upper edges of the braces A², the tendency of which springs is to cause the rear edge of the fender section D to be raised when released from the latches B to cause the buffer bar to be thrown down against the track. It will be understood that said springs are under tension when the fender is in its normal position.

An arm J projects from the frame of the fender section D and is pivotally connected to a rod I which is adapted to actuate pneumatic mechanism, not shown, for applying the brakes as well as for actuating the rod N, which is connected with the edge of the fender section D, so as to return the fender to its normal position, said fender section being held in its normal position by the latches provided therefor.

The operation of my invention will be readily understood and is as follows. When an object comes in contact with the buffer bar F, longitudinal movements will be imparted to the bars F′ which in turn will impart longitudinal movements to the bars G, thus pushing in the latches B which will release the inner edge of the fender section D, thus allowing the springs H which are under tension to tilt up the rear portion of the fender section D, throwing the buffer truss bar down against the rails and simultaneously with the tilting of the fender, the rod I will be actuated for the purpose of actuating pneumatic means for applying the air brakes to the wheels of the car upon which the fender is mounted, and simultaneously with the application of the brakes by the movement of the rod I, the rod N will in turn be actuated by the pneumatic mechanism actuated by the movement of said rod I to return the fender to its normal position.

By the provision of a fender made in accordance with my invention, it will be noted that a simple and efficient means will be provided whereby the impact of the buffer bar against an object will cause the fender to drop simultaneously with the application of mechanism for applying the air brakes and returning the fender to its normal position.

What I claim to be new is:—

1. An automatic fender for cars, consisting of two fender sections, one fixed and the other hinged thereto, a buffer member upon the hinged fender section, latches upon one section and adapted to engage the other, means for releasing the latches as the buffer member comes in contact with an object, means for allowing the hinged fender section to tilt after it is released, and means designed as the fender tilts to actuate brake operating mechanism, as set forth.

2. An automatic fender for cars, consisting of two fender sections, one fixed and the other hinged thereto, a buffer member having bars projecting therefrom and mounted upon the hinged fender section, spring-pressed latches upon the fixed fender section, rods upon the hinged fender section and adapted to be actuated longitudinally by said bars upon the buffer member to release said latches, springs for causing the said hinged section to tilt when released, and means actuated by the swinging of the hinged fender section to cause brake mechanism to be applied, as set forth.

3. An automatic fender for cars, consisting of two fender sections, one fixed and the other hinged thereto, a buffer member having bars projecting therefrom and mounted upon the hinged fender section, spring-pressed latches upon the fixed fender section, rods upon the hinged fender section and adapted to be actuated longitudinally by said bars upon the buffer member to release said latches, springs interposed between the fenders for causing the hinged section to tilt when released, means actuated by the swinging of the hinged fender section to cause pneumatic mechanism for applying the brakes to be actuated, and a rod connected to the hinged fender section and adapted to be actuated by the said pneumatic mechanism for returning the hinged fender section to its normal position, as set forth.

4. An automatic fender for cars, comprising a fixed fender section for attachment to a car and having brace bars at the opposite ends thereof, a hinged fender section pivoted to said brace bars, springs fastened to the frame of the hinged fender section and to said brace bars, latches projecting through apertures in the fixed fender section and adapted to engage the inner edge of the hinged fender section, a buffer member having rearwardly projecting bars movable upon the hinged buffer section, longitudinally movable rods mounted upon the hinged buffer section with their forward ends passing through apertures in the hinged fender section and against which said bars are adapted to contact as the buffer member comes in contact with an obstruction, thus causing the latches to be released to allow the springs to tilt the hinged fender section, and means connected to the latter for causing the brakes to be applied, as set forth.

In testimony whereof I hereunto affix my signature in presence of two witnesses.

FREDERICK ROBERT WOOLLEY, Jr.

Witnesses:
   THOMAS McKEON,
   N. A. DECKER.